United States Patent [19]

Marique et al.

[11] Patent Number: 5,782,949
[45] Date of Patent: Jul. 21, 1998

[54] DEVICE FOR THE MANUFACTURE OF FLAT GLASS SHEET WITH IMPROVED CHARACTERISTICS

[75] Inventors: Jean Claude Marique, Sambreville, Belgium; Pier Paolo Boattini, Vasto, Italy

[73] Assignee: Societa Italiana Vetro - SIV - S.p.A., San Salvi CH, Italy

[21] Appl. No.: 708,960

[22] Filed: Sep. 6, 1996

Related U.S. Application Data

[62] Division of Ser. No. 348,976, Nov. 28, 1994, Pat. No. 5,597,394.

[30] Foreign Application Priority Data

Nov. 30, 1993 [IT] Italy .................. RM93A0797

[51] Int. Cl.⁶ .................................................. C03B 35/00
[52] U.S. Cl. .................................... 65/182.2; 65/182.1
[58] Field of Search ........................ 65/60.1, 114, 195, 65/25.2, 25.3, 84, 90, 95, 99.1, 99.2, 182.2

[56] References Cited

U.S. PATENT DOCUMENTS

| | | |
|---|---|---|
| 3,506,422 | 4/1970 | Walters . |
| 3,776,712 | 12/1973 | Wilde ................................ 65/114 |
| 3,961,120 | 6/1976 | Hearn et al. ...................... 65/60.5 |
| 4,081,260 | 3/1978 | Glikman et al. . |
| 4,293,594 | 10/1981 | Yoldas et al. . |
| 4,525,194 | 6/1985 | Rudoi ................................ 65/145 |
| 5,093,196 | 3/1992 | Hecq et al. . |

FOREIGN PATENT DOCUMENTS

| | | |
|---|---|---|
| 1 80-7 582 | 5/1970 | Germany . |
| 1197258 | 7/1970 | United Kingdom . |
| 1 555 139 | 11/1979 | United Kingdom . |
| 1 555 360 | 11/1979 | United Kingdom . |
| 92/16466 | 10/1992 | WIPO . |

OTHER PUBLICATIONS

Soviet Inventions Illustrated, Section Ch, Week 8311, 27 Apr. 1983, Derwent Publications Ltd., London, GB; Class L01, An 83–26827K & SU–A–556 592 (Sarat Cons Glass), 7 Sep. 1982 * abstract *.

Soviet Inventions Illustrated, Section Ch, Week 8318, 15 Jun. 1983, Derwent Publications Ltd., London, GB; Class L01, An 83–43398K & SU–A–230 393 (Sarat Glass Res Ins), 30 Aug. 1982 * abstract *.

*Primary Examiner*—Donald E. Czaja
*Assistant Examiner*—Calvin Padgett
*Attorney, Agent, or Firm*—Wenderoth, Lind & Ponack

[57] ABSTRACT

A flat glass sheet is formed using the float process. Before annealing of glass carried on rollers, the glass is conveyed by a fluid bed formed by a mixture of gasses, in order to cool the glass to approximately 600° C. before it reaches an annealing lehr.

14 Claims, 3 Drawing Sheets

DEVICE FOR THE MANUFACTURE OF FLAT GLASS SHEET WITH IMPROVED CHARACTERISTICS

This is a divisional application of Ser. No. 08/348,976, filed Nov. 28, 1994, now U.S. Pat. No. 5,597,394.

FIELD OF THE INVENTION

1. Background of the Invention

The present invention relates to a device for the manufacture of flat glass sheets with improved optical and mechanical characteristics.

In particular, the invention relates to an improvement in a device for the transfer of a glass sheet strip from a molten metal tin bath to a roller annealing lehr device during a process of manufacturing flat glass sheets using the "float" method, known in the art.

2. Description of the Prior Art

It is a known fact that flat glass sheets are manufactured in plants providing a first stage in which raw materials are melted and a subsequent stage in which a glass sheet is formed by floating and sliding the molten material on a tin bath. These plants, known in the art as float plants, provide an annealing lehr downstream of the molten tin bath in order to provide the glass sheet strip with required mechanical characteristics.

PCT patent application No. 92/16466 filed by the GLASSTECH company describes a float plant equipped with an annealing lehr in which a glass sheet strip travels while being supported on a fluid bed. The aim of this device is to provide an annealing process in which the glass sheet strip does not come into contact with rollers, as is the case in the conventional method, in order to improve the optical and mechanical characteristics of the glass surface itself. Thus, the glass surface at this stage still is at a high temperature and could be damaged if it comes in contact with rollers.

A main inconvenience of the above described device is that it is necessary to carry out expensive modifications to existing systems, as the integral replacement of the annealing lehr which is several dozen meters long becomes necessary. Another inconvenience is that when manufacturing a new float plant, the realization of an annealing lehr having an entirely fluid bed requires high investment, and furthermore process control is difficult.

SUMMARY OF THE INVENTION

The aim of the present invention is to overcome the above mentioned problems.

It has been surprisingly found that an identical improvement in the optical and mechanical characteristics of the glass sheet strip surface is obtained by placing between the tin bath and the traditional annealing lehr entrance, equipped with conveying rollers, a device that generates a fluid bed which serves to cool the glass sheet strip and to support it adequately as it travels toward the next roller annealing lehr.

An object of the present invention is therefore to provide a device for manufacturing glass sheets with improved optical and mechanical properties, including a furnace for melting raw materials, a tin bath for the formation of the glass sheet strip and an annealing lehr equipped with rollers to convey the glass sheet strip. Between the molten tin bath and the roller annealing lehr is provided a stage during which the glass sheet strip is pre-cooled and conveyed on a fluid bed in order to obtain a controlled lowering of the glass temperature itself by the cooling and supporting action of mixtures of gasses.

This device reinforces the surface of the glass, preventing it from being damaged by subsequent contact with the rollers, and allowing the next annealing operation to be performed in a conventional roller lehr without the danger of damaging the surface of the glass and the reduction of optical features.

In the present invention the fluid bed is formed by suitable mixtures of gasses, at controlled temperatures and flow rates, in order to allow the glass strip to reach the entrance to the roller annealing lehr at a temperature not exceeding approximately 570° C. (±10° C.), whatever the temperature of the glass upon exiting the tin bath. It is preferred that the temperature of the glass upon entering the device according to the present invention be between 650° C. and 600° C., according to the thickness of the glass and the speed at which it is conveyed, so that a thermal head from 600°–650° C. upon entering the device and 570° C. upon leaving it can be obtained and controlled by the temperature and flow rate of the gasses in the fluid bed. The annealing of the glass sheet strip by the gradual lowering of the temperature from approximately 570° C. to approximately 495° C. is then performed as usual in the annealing lehr equipped with rollers.

The device of the present invention is preferably made up of two or more modules, independent of each other, provided with gas nozzles to emit the gasses and create the fluid bed. Such nozzles are positioned above and below the level of the glass sheet strip, and are divided into groups the flow rates of which can be independently adjusted so as to adapt to the different sizes and degrees of flatness of the strip of glass.

The advantage of this device is that it is divided into two parts relative to the direction of travel of the glass sheet strip. The first part provides a fluid bed made up of a mixture of hydrogen and nitrogen, in which the hydrogen is included between 4 and 8% of the nitrogen. The second part provides a mixture made up of air and SO2, in which the SO2 is present in a percentage ranging between 10 and 12% with respect to the air.

Advantageously the same device can also be used to deposit thin layers on one or both the surfaces of the glass. In this case the fluid bed of the second part, as defined above, is made up of a mixture of air and organic metal elements (for example Ti, Fe, Sn, Sb, Co, Zn, Zr, Si, etc.) suitably prepared for chemical vapor phase deposition.

Furthermore the device can also be advantageously used to improve cohesion between the glass substrate and the thin layer, by providing the emission of suitably chosen mixed gasses (for example in this case a mixture of fluorine and sulphur dioxide will be used in the first part, and a mixture of air and organic metal elements in the second part).

In other words, the process and the device described above and forming the object of the present invention allow a number of technical problems to be solved simultaneously. Improvement of the optical and mechanical characteristics of the glass surface, thin layer deposition, cohesion improvement between the surface of the substrate and the thin layers deposited thereon, while also giving the advantage of notably reducing installation costs, all can be achieved by use of a single, multi-purpose device.

All the above is possible thanks to the fact that the device in question is installed in the area between the tin bath and the annealing lehr.

BRIEF DESCRIPTION OF THE DRAWINGS

Additional characteristics and details of the invention will be described below with reference to the accompanying drawings, given merely as non-limiting examples, in which a preferred embodiment of the device according to the present invention is shown, and in which.

DETAILED DESCRIPTION OF THE INVENTION

Figure 1:
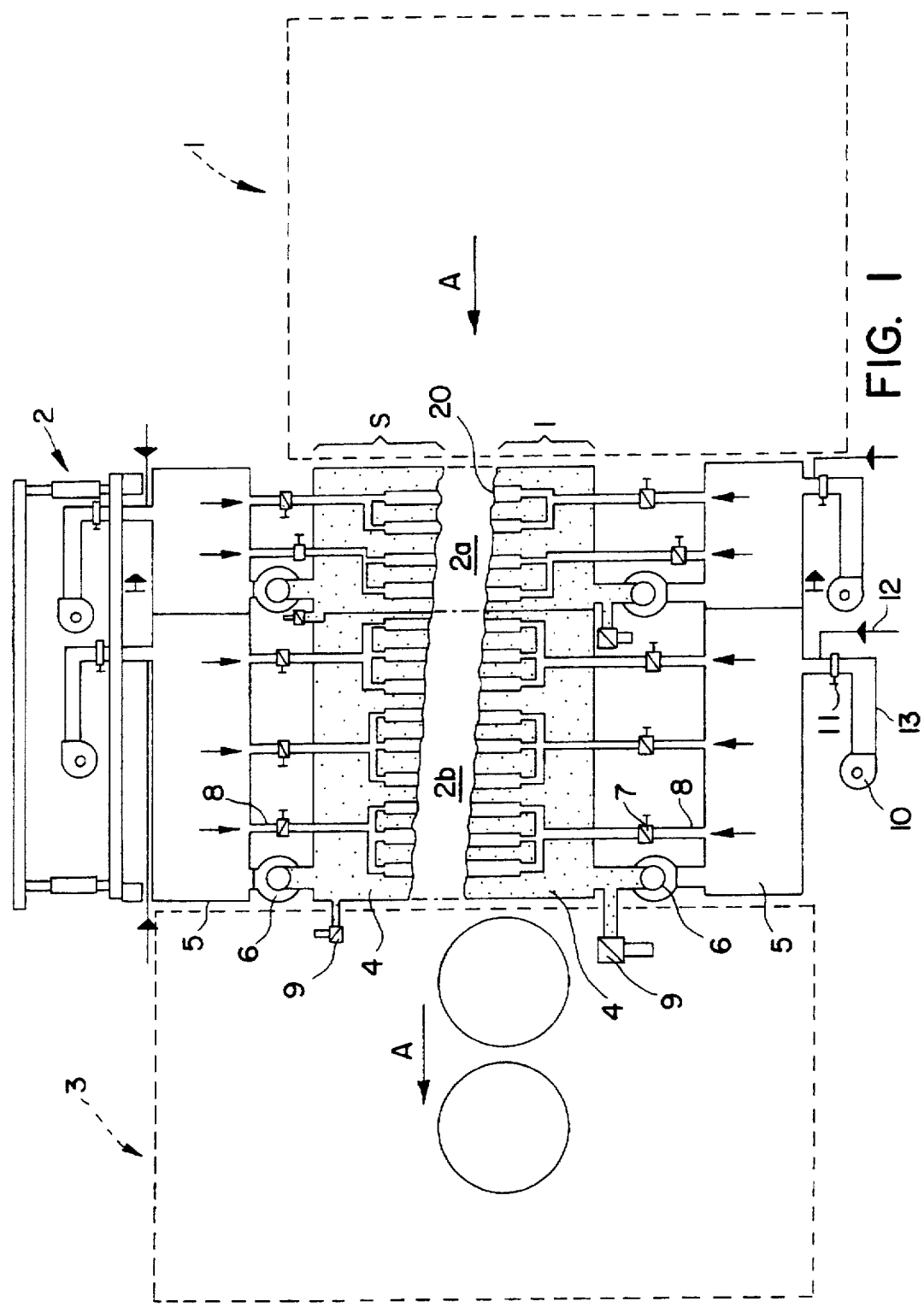
FIG. 1 is a vertical sectional view of a device in accordance with the present invention.
Figure 2:
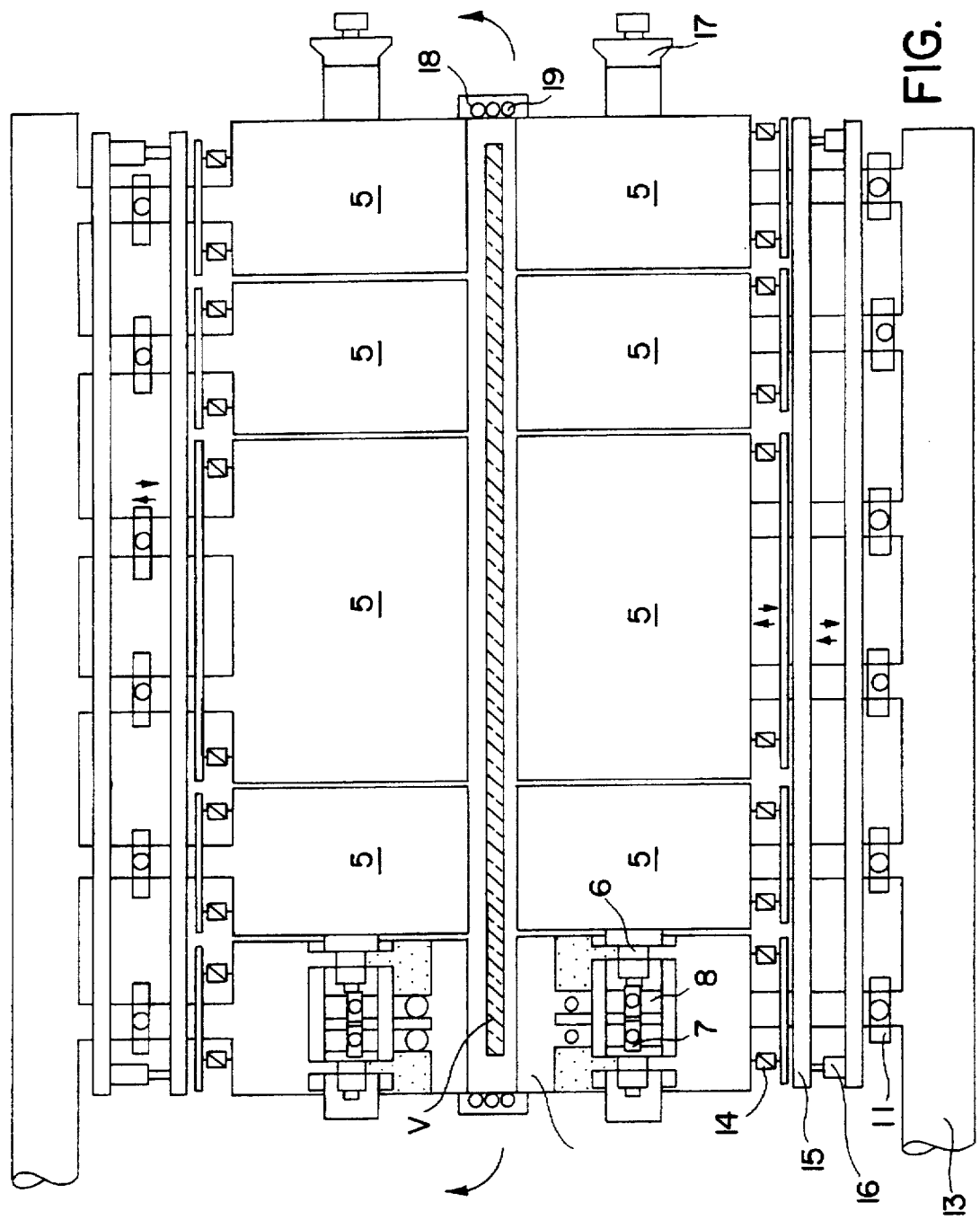
FIG. 2 is a vertical cross-sectional view of the device.
Figure 3:
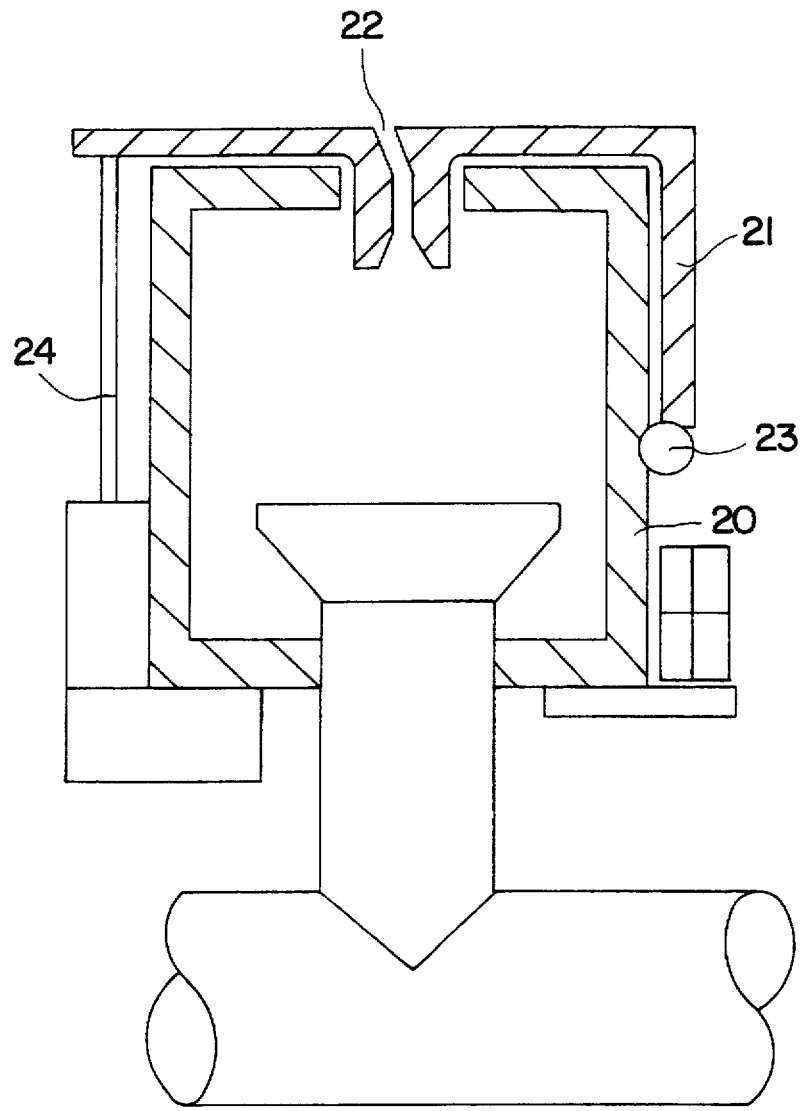
FIG. 3 is a vertical sectional view of a blowing nozzle.

With reference to FIGS. 1 to 3 and according to the present invention, the device 2 in conformity with the invention is positioned between a tin bath 1 and a roller annealing lehr 3. The direction of travel of a glass sheet strip is indicated by arrow A. The device 2, as shown in FIG. 1, is made up of two sections, i.e., upstream section 2a closest to the tin bath 1 and having a length not exceeding 500 millimeters, and a following downstream section 2b having a length not exceeding 1000 millimeters. The device is divided into two sections so that it can operate with different gas mixtures, and in addition, in case of malfunction in one of the two sections, to enable the faulty section to be removed, while continuing to work with the other one.

Two modules, i.e., an upper module S and a lower module I, relative to the traveling level of the glass strip, makes it possible to use suitable gas mixtures, at suitable temperatures, on each of respective opposite sides of the glass strip. Each module has a tank 4 for re-circulation of a gas mixture and a tank 5 for preparation of the gas mixture and distribution thereof through conduits 8 to form a fluid bed. Re-circulation fans 6 cause the gas mixture to flow from the re-circulation tank 4 to the preparation and distribution tank 5. Each conduit 8 has an adjustment valve 7 to adjust the flow rate of the gasses in the fluid bed.

A temperature adjuster 9 is positioned between the re-circulation tank 4 and the distribution tank 5 to maintain the temperature of the fluid bed at a desired level, in order to control the thermal gradient of the glass sheet strip during its travel from the tin bath to the annealing lehr 3. A fan 10, connected by conduit 13 to a valve 11 and a respective tank 5, maintains the flow rate of the fluid at the desired level. Feeder pipes 12 supply the gas necessary to form the gas mixture for the fluid bed.

The tanks 5 are supported by jacks 14 resting on plates 15 which in turn rest on jacks 16, so that the group of tanks 4 and 5, which are integral with each other, can be lowered or raised with respect to the level of glass sheet strip, according to need. As can be seen from FIG. 1, the device seen in cross-section and the fluid bed generated thereby are inclined when compared to the horizontal by an amount preferably comprised between 1.2° and 5°.

With reference to FIG. 2, the group of tanks 4 and 5, which are integral with each other, is preferably divided into modules having different widths, which decrease from the center of the glass sheet strip V outwardly, in order to allow greater flexibility of adjustment in the peripheral areas of the glass strip V where temperature distribution is less than in the central areas thereof.

Cooling fans 17 are used to maintain the fans 6 re-cycling the fluid bed at a constant temperature. The sides of the device are closed by using moving doors 18 provided with heating elements 19 to compensate any heat loss at the edges.

Nozzles generating the fluid bed are shaped so that they allow the glass strip V to be supported on each side, and optional chemical vapor phase deposition of metal oxides to form thin layers on the other side. In particular, distribution of the mixture takes place by means of nozzles 20. These nozzles are arranged in the module I below and the module S above the glass sheet strip, so that deposition can take place on the upper or lower surfaces of the strip of glass. Each nozzle 20 has a coating 21 of refractory material, in which a slot 22 for emission of the gaseous mixture is formed (see FIG. 3). Slot 22 is inclined in the same direction as the direction of movement of the glass sheet strip, in order to reduce gas turbulence to a minimum and thus allow the best possible conditions for chemical deposition of thin layers. The block of refractory material 21 is in turn hinged around hinge 23 and undergoes the thrust of a piston 24. This piston, according to requirements, alters the inclination of the refractory material block, and thus of the slot 22, with respect to the horizontal.

We claim:

1. A device for the manufacture of a flat glass sheet, said device including a molten tin bath stage for forming a glass sheet strip, an annealing lehr having rollers for conveying the glass sheet strip from said molten tin bath stage in a direction of travel, and a fluid bed between said molten tin bath stage and said annealing lehr for pre-cooling the glass sheet strip while supporting the glass sheet strip, said fluid bed comprising:

a first, upstream fluid bed section and a second, downstream fluid bed section, relative to said direction of travel; and means for supplying a first gas stream mixture to said first section and a second gas stream mixture to said second section from respective first and second supplies that are separate and not in direct fluid communication.

2. A device as claimed in claim 1, wherein said first section has a length, in said direction of travel, not exceeding 500 mm.

3. A device as claimed in claim 2, wherein said second section has a length, in said direction of travel, not exceeding 1000 mm.

4. A device as claimed in claim 1, wherein said second section has a length, in said direction of travel, not exceeding 1000 mm.

5. A device as claimed in claim 1, wherein said means for supplying comprises respective first and second groups of nozzles for blowing respective said gas mixtures.

6. A device as claimed in claim 5, wherein said nozzles are inclined to the horizontal.

7. A device as claimed in claim 6, wherein said nozzles are inclined by an angle of between 1.2 degrees and 5 degrees.

8. A device as claimed in claim 5, wherein said first and second groups of nozzles each include nozzles to be positioned above and below the glass sheet strip.

9. A device as claimed in claim 5, wherein each said nozzle has a slot inclined in said direction of travel for emission of the respective gas mixture.

10. A device as claimed in claim 9, wherein each said nozzle has a coating of refractory material having the same shape as said each nozzle and mounted for free movement about a hinge fixed to said each nozzle, thereby enabling adjustment of inclination of said coating relative to the horizontal.

11. A device as claimed in claim 5, wherein said means for supplying further includes plural, separate tanks for blowing of a respective said gas mixture, said tanks being arranged adjacent to each other in a direction transverse to said direction of movement, and said tanks to be arranged at edges of the glass sheet strip having a width less than said tanks to be arranged at a center of the glass sheet strip.

12. A device as claimed in claim 1, wherein said first gas mixture comprises nitrogen and between 4 and 8% hydrogen, and said second gas mixture comprises air and between 10 and 12% sulphur dioxide.

13. A device as claimed in claim 1, wherein said first gas mixture comprises nitrogen and between 4 and 8% hydrogen, and said second gas mixture comprises air and organic metal elements to form by chemical phase deposition a thin layer on at least one surface of the glass sheet strip.

14. A device as claimed in claim 1, wherein said first gas mixture comprises fluorine and sulphur dioxide, and said second gas mixture comprises air and organic metal elements to form a thin layer on the glass sheet strip.

* * * * *